US012366363B2

(12) United States Patent
Matzinger et al.

(10) Patent No.: US 12,366,363 B2
(45) Date of Patent: Jul. 22, 2025

(54) DOMESTIC APPLIANCE AND METHOD FOR DETERMINING CONTOUR INFORMATION OF MATERIAL

(71) Applicant: BSH Hausgeräte GmbH, Munich (DE)

(72) Inventors: Sebastian Matzinger, Erharting (DE); Kerstin Rigorth, Mühldorf (DE); Sebastian Sterz, Großaitingen (DE); Max Stief, Vogtareuth (DE); Matthias Vogt, Obersulm (DE)

(73) Assignee: BSH Hausgeräte GmbH, Munich (DE)

( * ) Notice: Subject to any disclaimer, the term of this patent is extended or adjusted under 35 U.S.C. 154(b) by 883 days.

(21) Appl. No.: 17/432,121

(22) PCT Filed: Mar. 24, 2020

(86) PCT No.: PCT/EP2020/058153
§ 371 (c)(1),
(2) Date: Aug. 19, 2021

(87) PCT Pub. No.: WO2020/200913
PCT Pub. Date: Oct. 8, 2020

(65) Prior Publication Data

US 2022/0154941 A1 May 19, 2022

(30) Foreign Application Priority Data

Apr. 1, 2019 (DE) ..................... 10 2019 204 531.6

(51) Int. Cl.
*F24C 7/08* (2006.01)
*F24C 15/00* (2006.01)
*H05B 6/64* (2006.01)

(52) U.S. Cl.
CPC ............ *F24C 7/085* (2013.01); *F24C 15/008* (2013.01); *H05B 6/6447* (2013.01)

(58) Field of Classification Search
None
See application file for complete search history.

(56) References Cited

U.S. PATENT DOCUMENTS

2014/0268177 A1* 9/2014 Saito .................. G01B 11/2518
356/601
2015/0359047 A1* 12/2015 Kishimoto ............. F24C 7/085
219/704

(Continued)

FOREIGN PATENT DOCUMENTS

DE 102015225859 A1 * 6/2017
EP 3258742 A1 * 12/2017 .............. F24C 7/085

OTHER PUBLICATIONS

Translation of DE-102015225859-A1 (Year: 2017).*

(Continued)

*Primary Examiner* — Elizabeth M Kerr
(74) *Attorney, Agent, or Firm* — Michael E. Tschupp; Andre Pallapies; Brandon G. Braun

(57) ABSTRACT

A household appliance includes a treatment chamber for treating material, a pattern luminaire designed to radiate a light pattern into the treatment chamber, an image sensor directed into the treatment chamber for capturing the light pattern reflected from the treatment chamber, and a motor operably connected to the pattern luminaire for rotating the pattern luminaire into different angles of rotation so as to enable the household appliance to determine at least one item of contour information from material irradiated by the light pattern from at least two reflected light patterns associated with different ones of the angles of rotation of the pattern luminaire.

9 Claims, 5 Drawing Sheets

(56) References Cited

U.S. PATENT DOCUMENTS

| | | | | |
|---|---|---|---|---|
| 2017/0115008 | A1 | 4/2017 | Erbe | |
| 2018/0187899 | A1* | 7/2018 | Matarazzi | F24C 7/08 |
| 2020/0003428 | A1* | 1/2020 | Kondo | F24C 15/008 |
| 2020/0182610 | A1* | 6/2020 | Shibusawa | G01K 7/427 |

OTHER PUBLICATIONS

Translation of EP-3258742-A1 (Year: 2017).*
International Search Report PCT/EP2020/058153 dated Jun. 18, 2020.

* cited by examiner

DOMESTIC APPLIANCE AND METHOD FOR DETERMINING CONTOUR INFORMATION OF MATERIAL

CROSS-REFERENCES TO RELATED APPLICATIONS

This application is the U.S. National Stage of International Application No. PCT/EP2020/058153, filed Mar. 24, 2020, which designated the United States and has been published as International Publication No. WO 2020/200913 A1 and which claims the priority of German Patent Application, Serial No. 10 2019 204 531.6, filed Apr. 1, 2019, pursuant to 35 U.S.C. 119 (a)-(d).

BACKGROUND OF THE INVENTION

The invention relates to a household appliance having a treatment chamber for treating material, at least one pattern luminaire which is designed to radiate at least one light pattern into the treatment chamber and at least one image sensor directed into the treatment chamber for capturing the at least one light pattern reflected from the treatment chamber. The invention also relates to a method for determining contour information of food to be cooked which is located in a treatment chamber of a household appliance. The invention can be applied particularly advantageously to determining contour information of food to be cooked in an oven.

WO 2015185608 A1 discloses a cooking appliance which has a cooking chamber with a loading aperture which can be closed by means of a door, a light pattern projector arranged fixedly in respect of the cooking chamber for generating a light pattern, a camera for capturing images from a region which can be irradiated by the light pattern and an evaluation facility coupled to the camera for determining a three-dimensional shape of an object, which is located in the region which can be irradiated by the light pattern, by means of a light pattern evaluation, wherein the light pattern projector for radiating a light pattern is arranged in the cooking chamber, the camera is arranged fixedly in respect of the cooking chamber, the camera for capturing images from a region of the cooking chamber which can be irradiated by the light pattern is also arranged in the closed cooking chamber, and the evaluation facility is designed to repeatedly calculate the three-dimensional shape of the at least one object, which is located in the region of the cooking chamber which can be irradiated by the light pattern, during operation of the cooking appliance.

US 2018187899 A1 discloses an oven with a heated cooking chamber for cooking food, which comprises a three-dimensional scanning system, which is configured to detect information about the volume and/or the shape of a food, which is located in the heated cavity.

EP 2 149 755 A1 discloses an oven for baking food products. In order to improve automated heating processes, the oven comprises a camera and a distance sensor, which are used together to enable relevant product features which are used with automated heating processes to be determined.

WO 2013098004 A1 discloses an oven with a housing, a cooking chamber, in which a cooking process is carried out, and an optical acquisition facility, which is located in the cooking chamber and provides for the acquisition of data relating to a target object such as the food to be cooked or a food carrier, and which has a transmitter, which transmits light waves onto the target object, a receiver, which detects the light waves reflected by the target object, and a housing, which is located on a top side of the cooking chamber, and in which the transmitter and the receiver are assembled adjacent to one another so as to point into the cooking chamber.

DE 10 2016 107 617 A1 discloses a method for operating a cooking appliance and a cooking appliance with a heatable cooking chamber for preparing food to be cooked. The heating of the cooking chamber is set by a control facility. Here the control facility takes into account a parameter which is characteristic of the food to be cooked. In order to determine the parameter, the food to be cooked is acquired with a camera facility. Here the food to be cooked is illuminated by means of an illumination facility in order to generate a shadow. The shadow cast by the food to be cooked is acquired by the camera facility. The parameter which is characteristic of the food to be cooked is determined by an evaluation facility on the basis of the acquired shadow.

US 2008049210 A1 discloses a distance measuring sensor, in which in one embodiment a light-emitting element, which projects light onto a distance measuring object arranged on a reference surface, and a light-receiving element, which receives reflected light, which is reflected from the distance measuring object, is present, wherein the light-emitting element and the light-receiving element are sealed in each case individually with resin by means of a transparent resin sealing section. Furthermore, the external periphery of the transparent resin sealing section is covered by a light-impermeable resin sealing section, and the light-impermeable resin sealing section is provided with a light emission section slot, which restricts the light flow of the light projected onto the distance measuring object, and a light-receiving section, which restricts the light flow of the reflected light which is reflected by the distance measuring object.

BRIEF SUMMARY OF THE INVENTION

The object of the present invention is to overcome the disadvantages of the prior art at least partially, and in particular to provide an option which is structurally particularly simple and can be implemented in a compact manner in order to determine contour information of material located in a household appliance.

This object is achieved according to the features of the independent claims. Advantageous embodiments form the subject matter of the dependent claims, the description and the drawings.

The object is achieved by a household appliance, having a treatment chamber for treating material, at least one pattern luminaire which is designed to radiate at least one light pattern into the treatment chamber, and at least one image sensor directed into the treatment chamber for capturing the at least one light pattern reflected from the treatment chamber, wherein the pattern luminaire can be rotated by means of a motor and the household appliance is designed to determine at least one item of contour information from material irradiated by the light pattern from at least two reflected light patterns associated with different angles of rotation of the at least one pattern luminaire.

This household appliance is advantageous in that the contour information (e.g. height information, surface shape etc.) can be determined particularly reliably without movement, in particular without rotating the material as such. Moreover, this method is structurally simple and can be implemented in a compact manner.

The household appliance is in particular an electrically operated household appliance, in particular within the context of “white goods” e.g. a cooking appliance. The household appliance can be a cooking appliance such as an oven, a microwave appliance, a steam treatment appliance or any combination thereof, e.g. an oven with microwave function, a microwave oven etc. The material can then be food to be cooked, e.g. a meal, groceries etc., and the treatment chamber can then also be referred to as the cooking chamber. The treatment of the food to be cooked (“cooking”) can comprise heating, dampening with hot steam etc. The household appliance can however also be a refrigeration appliance such as a refrigerator, a laundry treatment appliance such as a washing machine, a tumble dryer or a combination thereof.

A pattern luminaire is understood to mean in particular an illumination apparatus with at least one light source, which is designed to emit a light pattern. A light pattern is understood to mean in particular a light distribution, such as a line pattern, a grid pattern, a triangular pattern etc. which is uniform in respect of its brightness. In particular the emitted light pattern can also comprise just one, in particular straight line.

The at least one light source is not restricted in terms of its type and can comprise e.g. at least one semiconductor light source such as at least one LED and/or at least one laser, in particular laser diode. The pattern luminaire can generate the entire light pattern simultaneously, e.g. by means of beam formation of the emitted light bundle using at least one optical element, for instance one or more lenses, reflectors and/or correspondingly shaped masks, diaphragms etc. In one embodiment, the pattern luminaire has at least one light source for generating a light bundle and at least one optical element arranged optically downstream of the light source for generating the light pattern from the light bundle emitted from the light source. The pattern luminaire can generate the light pattern alternatively by scanning a light beam, in particular a laser light beam, e.g. according to what is known as the flying-spot method.

The fact that a pattern luminaire is designed to radiate at least one light pattern into the treatment chamber means in particular that a pattern luminaire is used to generate a light pattern in precisely one shape and irradiate it into the treatment chamber, e.g. always a straight line. Alternatively, a pattern luminaire can be designed to generate different shapes or types of light patterns at different points in time, e.g. a straight line, a grid etc.

A light pattern radiated into the treatment chamber is projected or mapped onto a corresponding projection surface (e.g. comprising walls or accessories of the cooking chamber, food to be cooked etc.) The shape of this projection (“projection pattern”) corresponds, as is generally known, to a geometric adjustment of the shape of the radiated light pattern to the shape of the projection surface. The shape of the projection surface can be concluded from the shape of the projection pattern.

To this end, the light or light pattern (i.e. the projection pattern) reflected in the treatment chamber or on the projection surface (i.e. the projection pattern) is captured in images by means of the at least one image sensor. In other words, an image of the treatment chamber is captured by means of the at least one image sensor, which image shows or comprises the projection pattern. The image sensor can be, for instance, a CCD sensor, a digital camera etc.

The pattern luminaire can be targetedly rotated by means of the motor and can assume at least two different angles of rotation. The angles of rotation which can be assumed by the pattern luminaire can be changed by activating the motor in stages (e.g. by means of a stepped motor) or continuously or practically continuously.

The fact that the pattern luminaire can be rotated means in particular that it can be rotated so that the light patterns (e.g. measured in an image plane immediately behind the pattern luminaire) emitted at a different angle of rotation of the pattern luminaire can pass into one another by means of a rotation or rotational transformation. In other words, the light patterns emitted at a different angle of rotation can pass into one another by means of a rotational transformation about the axis of rotation of the pattern luminaire, in particular without further translation, namely by rotation about the difference of the two different angles of rotation.

By evaluating at least two reflected light patterns associated with different angles of rotation of the at least one pattern luminaire, the at least one item of contour information can be deduced. In this way, in one development, the household appliance is designed to generate the same light pattern (e.g. a straight line) and to radiate the same at different angles of rotation of the pattern luminaire into the treatment chamber.

In one development, at least one pattern luminaire is arranged in the region of a ceiling of the treatment chamber, since in this way a particularly large surface of material can advantageously be irradiated with a light pattern. Here an arrangement in the region of a center of the ceiling is particularly advantageous.

In one development, at least one image sensor is likewise arranged in the region of a ceiling of the treatment chamber, particularly in the region of a corner of the ceiling. The advantage is therefore achieved that the projection pattern can also be imaged or detected in a particularly effectively resolved manner on lateral surface regions of material.

The fact that the household appliance is designed to determine contour information can be implemented so that the household appliance has a corresponding data processing or evaluation facility, which can be integrated into a control facility of the household appliance, for instance. Alternatively or in addition, in order to determine the contour information, the household appliance can have a communication apparatus for communication with an external data processing apparatus which can be coupled by way of a data network, e.g. with a network server or what is known as a cloud computer. Basically the course of the data processing steps required for contour determination can be divided arbitrarily between the household appliance and the external data processing apparatus and thus also embodied at least substantially outside of the household appliance.

In one embodiment, at least one pattern luminaire is a circumferentially rotating pattern luminaire, in other words can be rotated by 360° about its axis of rotation. This is advantageous in that light patterns can be radiated into the treatment chamber with a particularly high angle variation, which in turn can increase the reliability of the contour information.

In one development, at least one pattern luminaire has a restricted rotational range (i.e. with less than 360°) e.g. of [0°, 180°] [0°, 90°] etc. A rotation mechanism can therefore be embodied particularly easily if necessary.

In one embodiment, the at least one pattern luminaire is precisely one pattern luminaire. This advantageously enables a particularly cost-effective and compact arrangement.

In one embodiment, the household appliance is designed to determine the at least one item of contour information of the material from a superimposition of at least two reflected light patterns associated with different angles of rotation of a pattern luminaire. The superimposition is in particular a visual superimposition; the reflected light patterns or projection patterns from two images captured at different angles of rotation can be superimposed and then evaluated, or they can be evaluated separately and then linked etc.

In one embodiment, the at least one pattern luminaire has at least two rotatable pattern luminaires arranged at a distance from one another. They can have in particular different spatial alignments or radiation directions. The advantage is achieved in that material can be irradiated with the light pattern from different spatial angles or from a number of sides; this enables a particularly large-area acquisition of contour information of the material. In particular, shadow regions of a pattern luminaire can also be illuminated by another pattern luminaire. The reflected light patterns or the projection patterns associated with two different angles of rotation typically have (i.e. when the angle of rotation does not correspond to an angle of symmetry of the radiated light pattern) at least one point of intersection or crossing point. This facilitates an evaluation and determination of the contour information since contour information can be determined particularly easily and reliably from the position of crossing points.

In one embodiment, the at least one image sensor has at least two image sensors arranged at a distance from one another and aligned at different spatial angles in the treatment chamber. This is advantageous in that light reflected onto the material can be captured or detected particularly completely or over a large area.

In one development, each pattern luminaire is assigned an image sensor, wherein an image region of an image sensor comprises a projection region of the pattern luminaire completely or partially. Alternatively, a number of image sensors can be assigned to a pattern luminaire, the image regions of which comprise the projection region of the pattern luminaire completely or partially from different spatial angles. It is also possible for a number of pattern luminaires to be assigned to at least one image sensor, in other words its image region comprises the projection regions of a number of pattern luminaires completely or partially.

In one embodiment, the at least one pattern luminaire has at least two rotatable pattern luminaires, the simultaneously radiated light patterns of which intersect in the treatment chamber in the case of at least one set of angular positions of the pattern luminaires, in other words form at least one crossing point with one another.

In one development, the number of rotatable pattern luminaires have a different rotational speed and/or opposite direction of rotation of their light pattern or the reflected light pattern generated as a result in the treatment chamber. As a result, a particularly diverse temporal development or sequence of crossing points can be provided, which in turn can increase a reliability when the contour information is determined.

In one development, the light pattern or patterns are individual lines. This facilitates an evaluation for determining the contour information. If just one light pattern source is present, it then always in particular radiates a straight line into the treatment chamber, but at different angles of rotation. If a number of light pattern sources are available, they each radiate a straight line into the treatment chamber.

In one embodiment, the at least one pattern luminaire has beam-forming optics, in particular a lens, and can be rotated about an optical axis of the optics. A particularly simple structure is thus achieved.

In one development, the at least one light source rotates, which allows for a particularly compact structure and supports an embodiment of the pattern luminaire as a module.

In one development, the at least one light source is arranged to be stationary and therefore does not rotate. This enables a simple arrangement also of more complex light sources and a structurally particularly simple embodiment of the rotatable components. For instance, the light from a stationary light source can be radiated directly onto the beam-forming optics, radiated indirectly by way of deflection optics onto the beam-forming optics and/or radiated by way of at least one light guide onto the beam-forming optics.

In one embodiment, the household appliance has at least one rotatable microwave antenna and at least one pattern luminaire is arranged on the microwave antenna. By combining microwave antenna and pattern luminaire or light injection, the antenna motor can be used in two functions, namely to rotate the pattern luminaire and to rotate the antenna during a microwave operation. The axis of rotation of the microwave antenna then corresponds to the axis of rotation of the pattern luminaire. In one development, the microwave antenna can be used simultaneously to radiate microwaves and a light pattern. However, these two functions can also be used individually. The pattern luminaire or at least one of its components can be fastened to the microwave antenna or integrated at least partially into the microwave antenna.

In one embodiment, the microwave antenna has a hollow shaft which can rotate about its longitudinal axis for supplying microwaves into the treatment chamber, in which at least one optical element of the pattern luminaire is accommodated, in particular at least one optical element for forming the light pattern. In this way, a particularly compact and robust pattern luminaire can advantageously be provided. The at least one light source can likewise be arranged on or in the shaft and can thus likewise rotate. Alternatively, the at least one light source is arranged outside of the shaft, in a particular in a stationary or non-motor-drive rotating manner. The advantage is achieved in that the arrangement, shape and/or size of the light source(s) can be chosen practically arbitrarily. The at least one light source can also shield against an influence of microwave radiation particularly easily and effectively. The light bundle generated by the at least one light source can be radiated into the shaft e.g. at an open end facing away from the treatment chamber, possibly by way of deflection optics and/or a light guide.

At least one antenna impeller or antenna blade can be arranged on the microwave antenna or on the shaft and is provided to influence, in particular to homogenize, a distribution of the microwave radiation in the treatment chamber. The microwave antenna can be connected to a microwave generator such as a magnetron or a semiconductor-based microwave generator, namely directly or by way of a microwave guide.

In one embodiment, the shaft is separated from the treatment chamber at least in sections by a cover which has an aperture and is permeable to microwaves. The advantage is achieved in that the microwave antenna is protected against contamination, e.g. by means of vapor or spray, and nevertheless a radiation of the light pattern into the treatment chamber is not hampered. The cover separates in particular the treatment chamber from a space (dome) formed through a recess in a wall (e.g. ceiling) of the treatment chamber. The cover can be e.g. an electrically non-conductive plate e.g. made from ceramics. In particular, the shaft can be guided through the aperture or close flush therewith, as a result of which the cover advantageously reliably does not hamper a beam field of the pattern luminaire.

In one embodiment, the shaft has a first, electrically conducting longitudinal section and a second, electrically non-conducting longitudinal section, wherein the electrically conducting longitudinal section is located behind the cover (and thus in particular within the dome) and the electrically non-conducting longitudinal section is guided through the aperture. The advantage is achieved that the microwave distribution of the microwave antennas is not negatively affected or not noticeably negatively affected by the light pattern function, since only the electrically conductive section influences the line and/or distribution of the microwaves.

Alternatively, the second longitudinal section can also be electrically conducting. It can then consist of the same material as the first longitudinal section or also a different material.

In one embodiment, at least one optical element, in particular all optical elements, is accommodated in the electrically non-conducting longitudinal section. The advantage is therefore achieved that the at least one optical element is practically not influenced by microwaves, and vice versa. Assembly of the microwave antenna is therefore also facilitated.

In one embodiment, the at least one item of contour information comprises a height or an item of height information of the material, a surface shape of the material, a position of the material in the cooking compartment, in particular in a specific insertion plane, a surface dimension of the material, a volume of the material and/or a mass of the material. The mass can be determined for instance from the volume and the type of the material. The mass can supply an important parameter to achieve a desired cooking result particularly for automatic cooking programs or defrost functions.

The object is also achieved by determining contour information of material located in a treatment chamber of a household appliance, in which

- at least one light pattern is radiated into the treatment chamber and the light pattern reflected there is visually detected,
- step (a) is repeated again with at least one light pattern rotated in contrast,
- the reflected light patterns detected in steps (a) and (b) are superimposed and
- at least one item of contour information of the material is determined from the distortion of the superimposed, reflected light pattern, in particular compared with at least one light pattern, in particular superimposed light pattern, reflected from an unloaded treatment chamber.

The method can be embodied similarly to the household appliance, and vice versa, and has the same advantages.

In one embodiment, the method is carried out repeatedly over the course of a treatment process (e.g. cooking process), which is advantageous in that a temporal development or change in the contour or shape can be determined. As a result, it is in turn possible to conclude e.g. a treatment progress (e.g. a cooking progress) and to adjust the treatment process accordingly. For instance, an overflow of pasta can be monitored during a cooking process.

Generally speaking, the present invention can also comprise the case that a general lamp, which is not designed or not only designed to generate a light pattern, but additionally or instead thereof has a light for the general illumination of the cooking chamber and/or for the non-rotating radiation of light information, is arranged on a rotatable or non-rotatable microwave antenna.

This lamp can radiate light in particular through a hollow conductor of the microwave guide and/or microwave antenna into the cooking chamber.

BRIEF DESCRIPTION OF THE DRAWINGS

The afore-described properties, features and advantages of this invention and the manner in which these are achieved will become clearer and more intelligible in conjunction with the following schematic description of an exemplary embodiment, which is explained in more detail in conjunction with the drawings.

DETAILED DESCRIPTION OF EXEMPLARY EMBODIMENTS OF THE PRESENT INVENTION

Figure 1:
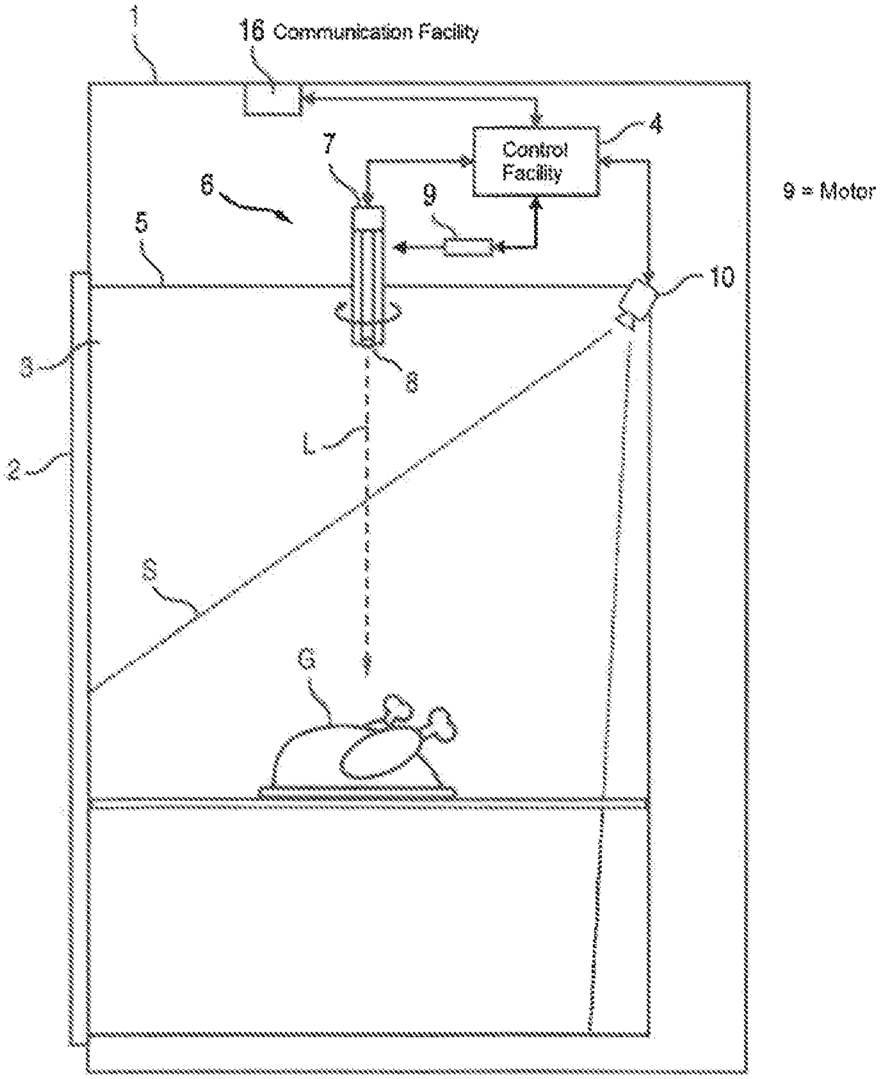
FIG. 1 shows as a sectional representation in the side view a drawing of a microwave cooking appliance with precisely one pattern luminaire and one image sensor.

FIG. 1 shows as a sectional representation in a side view a drawing of a microwave cooking appliance 1, e.g. a pure microwave appliance, a microwave oven or an oven with microwave function. The cooking appliance 1 has a cooking chamber 3 which can be closed by means of a door 2, in which food to be cooked G can be treated, in particular heated. The cooking appliance 1 or its operation can be controlled by means of a control facility 4, e.g. in order to carry out cooking programs and other operating procedures.

The cooking appliance 1 has a pattern luminaire 6 arranged at least approximately in the center of a ceiling 5 of the cooking chamber 3, which has at least one light source in the shape of a laser 7 and beam-forming optics 8 arranged downstream of the laser 7. The light bundle emitted by the laser 7 is formed by means of the beam-forming optics 8 into a light pattern L, which here by way of example assumes the form of a straight line in the beam path behind the optics 8, for instance.

The pattern luminaire 6 can be rotated by means of a motor 9 which can be controlled by the control facility 4, as indicated by the curved arrow. This means, also generally, that at least the beam-forming optics 8 can be rotated, while the laser 7 can likewise be arranged so as to be rotatable or alternatively stationary. By rotating the pattern luminaire 6, the light pattern L is rotated accordingly. The pattern luminaire 6 can be set targetedly to at least two angles of rotation or angles of rotation associated with different rotational positions. In one development, the pattern luminaire 6 can be rotated at least in an angular range [0°; 180'], e.g. continuously or at predetermined stages or angular distances such as 1°, 5°, 10°, etc.

An image sensor in the form of a camera 10, in particular color camera, is arranged in the region of a ceiling-side corner of the cooking chamber 3. A field of view S of the camera 10 which is indicated with dashed lines comprises typical spatial areas of the food to be cooked G and the projection surfaces of the radiated light pattern L. As a result, the camera 10 is designed to capture the light pattern or projection pattern reflected from the cooking chamber 3.

The images captured by the camera 10 can be evaluated by means of the control facility 4, in order to achieve or determine contour information associated with the food to be cooked G. Alternatively, the images can be evaluated inter alia in an external data processing facility such as a cloud computer (top fig), wherein the external data processing facility can be brought into communicative connection with the cooking appliance 3 by way of a communication facility 16 of the cooking appliance 3, such as e.g. a WLAN module, a Bluetooth module, an Ethernet module etc. In order to determine the contour information, at least two images captured at different angles of rotation of the pattern luminaire 6 of radiated light patterns L are evaluated linked, e.g. superimposed, as described in more detail below.

Figure 2:
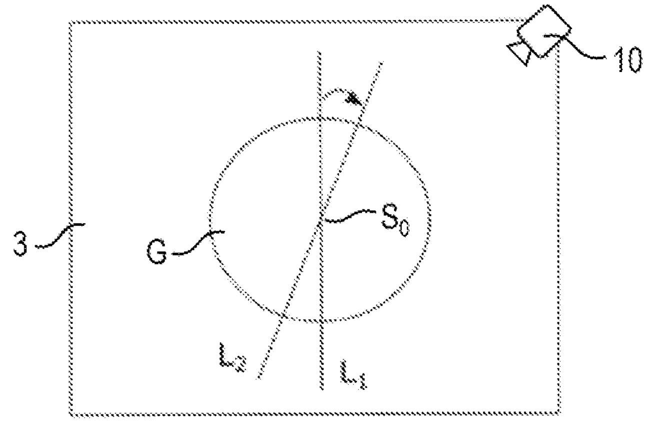
FIG. 2 shows a linear light pattern projected by means of a pattern luminaire at two different angles of rotation from the view of the pattern luminaire.

FIG. 2 shows a top view, from the view of the pattern luminaire 6, of an image-shaped superimposition of two linear light patterns ($L_1(D_1)$ and $L_2$ $(D_2)$) projected into the cooking chamber 3 at different angles of rotation $D_1$ and $D_2$ by means of the pattern luminaire 6. From this view, the light patterns L1 and L2 are both rectilinear, but are angle-offset about an angular difference $D_2–D_1$. As a result, a point of intersection or crossing point $S_0$ is produced at a known position in the superimposed image (namely at the site of the axis of rotation of the pattern luminaire 6). From this view the location of the light patterns L1 and L2 is independent of whether or not the food to be cooked G is located in the cooking chamber 3. It should be assumed below that the position of the point without food to be cooked G in the cooking chamber 3 is understood to mean the point of intersection or crossing point $S_0$ and can also be referred to as the "zero point". In one variant the height position of the zero point can be fixed as a function of the shelf level of the food to be cooked G.

Figure 3:
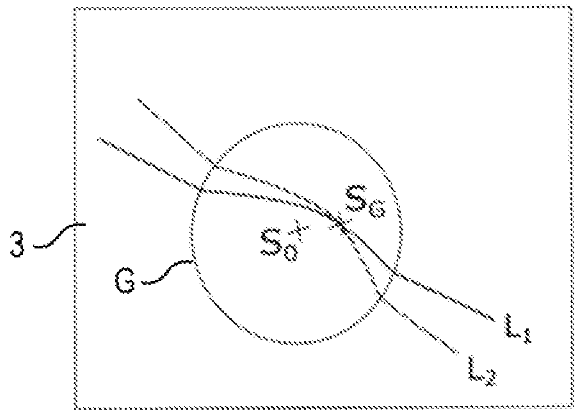
FIG. 3 shows the projected linear light pattern from FIG. 2 from the view of an image sensor.

FIG. 3 shows the projected linear light patterns L1 or L2 from FIG. 2 from the view of the camera 10. Since the camera 10 has an angle of view into the cooking chamber 3 which deviates from the axis of rotation of the pattern luminaire 6, at least the light patterns L1 or L2 projected onto the food to be cooked G are distorted or changed due to the shape of the food to be cooked G.

In particular, from the view of the camera 10, the point of intersection $S_G$ in the superimposed camera image is displaced depending on the height of the introduced food to be cooked G. By comparing the position of the point of intersection $S_G$ with the position of the point of intersection $S_0$ without the food to be cooked G or the size of the resulting displacement, the height of the food to be cooked G on the extension of the axis of rotation (i.e. the point of intersection of the axis of rotation with the food to be cooked G) of the pattern luminaire 6 can be determined as an item of contour information.

Furthermore, further contour information of the food to be cooked G can be determined with the aid of the course of the light patterns $L_1$, $L_2$. Therefore, depending on the surface shape of the food to be cooked G, the line curve in the camera image can be bent, elongated or interrupted, as a result of which it is possible to conclude a spherical, hollow or irregular food to be cooked.

Basically the points of intersection of any number of angle-offset radiated line patterns can be used to determine the height of the food to be cooked G. By evaluating light patterns L of an adequate number of different angles of rotation, it is possible, for instance, to determine the region of edges of the food to be cooked G, which are shaded or interrupted. By contrast, projection regions without food to be cooked indicate no displacement of the line pattern in respect of its zero position. It is therefore possible to determine an outline of the food to be cooked G, for instance, by way of geometric algorithms and convert this into an area, from which, as a function of the determined height, a square measure is calculated for the surface of the food to be cooked G. The height dependency of the area results from the area distortion in the camera image. The volume of the food to be cooked G can in turn be determined at least approximately from the square measure. For an even more precise calculation of the volume, the line distortion can also be taken into account at the site of the food to be cooked G.

Figure 4:
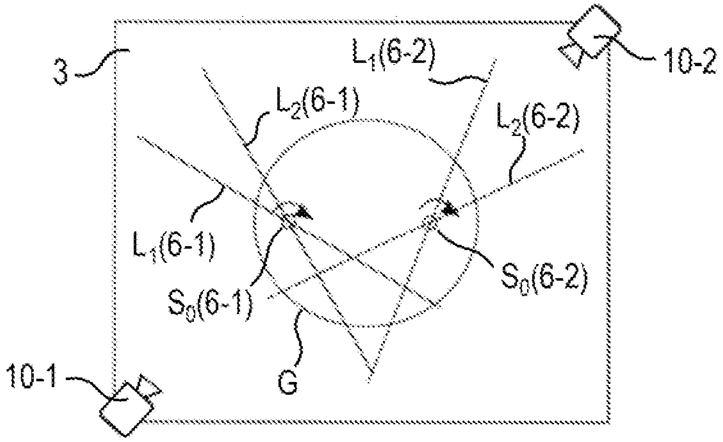
FIG. 4 shows in a top view similar to FIG. 2, by means of two pattern luminaires, projected linear light patterns at two different angles of rotation from the view of the pattern luminaires in an unloaded treatment chamber.

FIG. 4 shows, similarly to FIG. 2, linear light patterns ($L_1$ (6-1) and $L_2$ (6-1) or $L_1$ (6-2) and $L_2$ (6-2) (drawn through or shown dashed) projected by means of two ceiling-side pattern luminaires 6-1 and 6-2 (top fig.) arranged adjacent to one another at two different angles of rotation in each case from the view of the pattern luminaires 6-1 and 6-2 or in a top view.

Now at least two height positions of the food to be cooked G can advantageously be determined independently of one another. In general, contour information for each of the pattern luminaires 6-1 and 6-2 can be determined similarly to the procedure described in FIG. 2 and FIG. 3, for instance. The additional advantage results in that frequently larger surface areas of the food to be cooked G can be evaluated than with just one pattern luminaire 6, especially if the food to be cooked G has a complex shape. The pattern luminaires 6-1 and 6-2 can be controlled in particular independently of one another. The more independent pattern luminaires 6-1 and 6-2 are used, the more completely the cooking chamber 3 or the food to be cooked G present therein can be scanned.

It is particularly advantageous here if a number of cameras 10-1 and 10-2 are present, which are aligned at different spatial angles in the cooking chamber 3, since "dead angles", in which the light pattern L or $L_1$, $L_2$ in the camera image is concealed by the food to be cooked G, can largely be avoided.

It is now also possible to evaluate crossing points of light patterns $L_1$, $L_2$ associated with different pattern luminaires 6-1, 6-2.

The contour information of food to be cooked G can be determined repeatedly from the light patterns $L_1$, $L_2$ during the course of a cooking process, e.g. in order to monitor a cooking progress.

Figure 5:
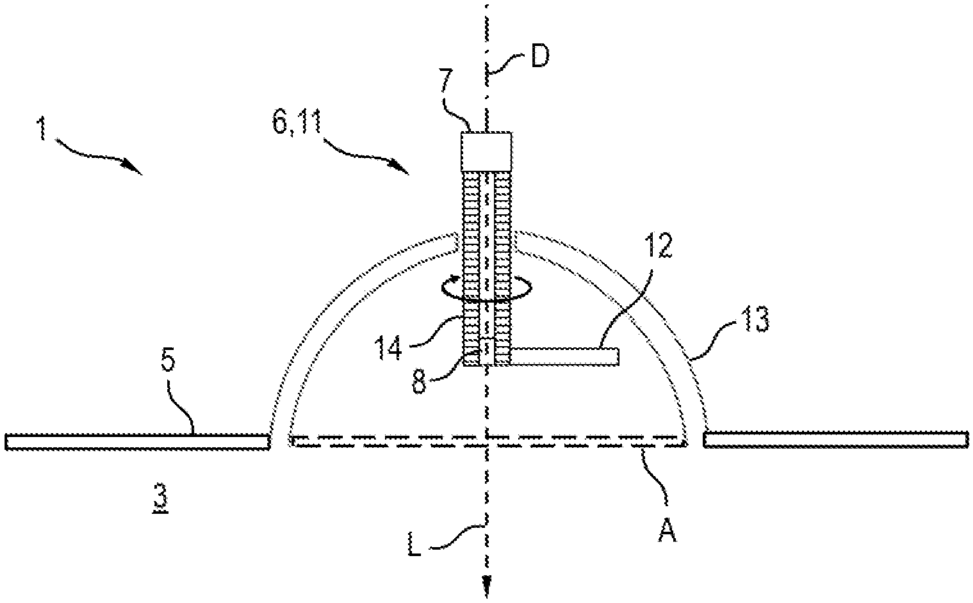
FIG. 5 shows as a sectional representation in the side view a drawing of a variant of the microwave cooking appliance from FIG. 1 with a pattern luminaire integrated into a microwave antenna according to a first exemplary embodiment.

FIG. 5 shows partially, as a sectional representation in the side view, a drawing of a variant of the microwave cooking appliance 1 with a pattern luminaire 6 integrated into a microwave antenna 11.

An electrically conductive microwave antenna was previously coupled to a microwave generator (top fig.) using microwave technology and is used to inject microwave radiation generated by the microwave generator into the cooking chamber 3. Microwave heating power (currently typically with a power of up to 1 kW) or lower measuring radiation (typically of a few mW) can be introduced into the cooking chamber 3 by way of the microwave antenna.

In order to prevent an in particular also prolonged uneven distribution of microwaves into the cooking chamber 3, it is known to configure the microwave antenna to be rotatable and to equip the same with at least one blade or impeller 12. By setting an angle of rotation of the microwave antenna, a specific, not necessarily known, microwave distribution can be set. In particular, it is known to change the microwave distribution in the cooking chamber 3 by changing the angle of rotation so that a microwave distribution, which is improved in order to cook the food to be cooked 3, is present. To this end, the microwave antenna can frequently be rotated about 360°, possibly gradually or practically continuously.

It is also known to accommodate the microwave antenna at least in sections in a recess or dome 13 of a wall (not limited here: the ceiling 5) of the cooking chamber 3. In this way the microwave antenna can be guided through the wall 5 with its end section facing way from the cooking chamber side, e.g. in order to be coupled to a microwave guide (top fig.).

Furthermore, it is known to cover the dome 13 on the cooking chamber side in order to protect against vapor, spray or other dirt or loads such as steam, thermal radiation etc. by means of a cover A, in particular tightly against the cooking chamber 3. The cover A can be e.g. a ceramic plate or another cover made from microwave-permeable material.

In order to integrate the pattern luminaire 6 into a microwave antenna 11 according to the present invention, the microwave antenna 11 has a hollow, in particular tube-shaped, shaft 14 which is in particular open on both sides, which can be rotated in a motor-drive manner about its longitudinal axis D. The at least one blade 12 is arranged laterally on the shaft 14 and rotates with the shaft 14.

The pattern luminaire 6 or the combined microwave antenna/pattern luminaire (which can also be referred to as "combined antenna" 6, 11) has the laser 7 or another light source (e.g. at least one LED) on the end of the shaft 14 facing away from the cooking chamber. The light bundle emitted by the laser 7 is radiated directly or indirectly (i.e. by way of deflection optics or light conductor) into the shaft 14 which can (but need not) then be used as a light guide and strikes the beam-forming optics 8. The optics 8 can expand the incident light bundle, e.g. into a light pattern such as a straight line, and can then be embodied as a grid, mask and/or lens, for instance.

The optics 8 are arranged in particular on an end section of the shaft 14 on a cooking chamber side. At least the optics 8 are fixedly connected to the shaft 14, and therefore rotate with the shaft 14. In one development, the laser 7 can likewise be attached fixedly connected on or in the shaft and then likewise rotate. Alternatively, the laser 7 is arranged to be stationary. In both cases, the longitudinal axis of the shaft 14 corresponds to the axis of rotation D of the pattern luminaire.

In the present exemplary embodiment, the cover A is omitted, in order to enable the light pattern L to radiate into the cooking chamber 3. Alternatively, a particularly thin transparent cover A can be used.

Figure 6:
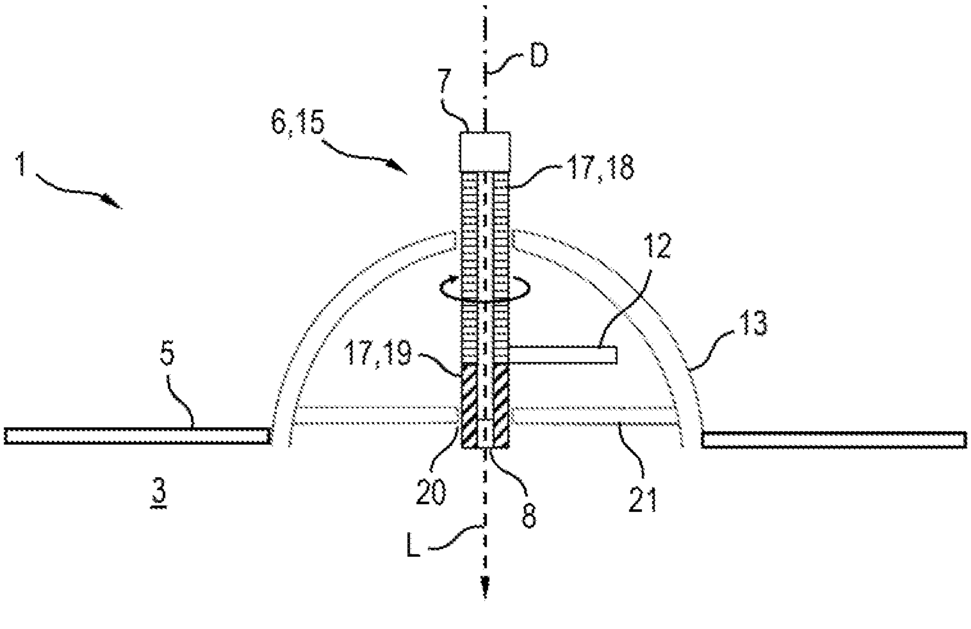
FIG. 6 shows as a sectional representation in a side view a drawing of a further variant of the microwave cooking appliance from FIG. 1 with a pattern luminaire integrated into a microwave antenna according to a second exemplary embodiment.

FIG. 6 shows partially as a sectional representation in the side view a drawing of a further variant of the microwave cooking appliance 1 with a pattern luminaire 6 integrated into a microwave antenna 15.

The microwave antenna 15 is designed similarly to the microwave antenna 11, but the hollow shaft 17 now has a (rear) longitudinal section 18, made from electrically conductive material such as metal, which projects through the dome 13 and faces away from the cooking chamber 3, as well as a (front) longitudinal section 19, made here by way of example from electrically insulating material such as ceramics or plastic, which faces the cooking chamber 3. The electrically conductive blade 12 is attached to the rear section 18. The rear longitudinal section 18 with the blade 12 is microwave-conducting or microwave-influencing, while the front longitudinal section 19 is not microwave-influencing or not noticeably microwave-influencing.

The front longitudinal section 19 projects rotatably through an opening or aperture 20 into an electrically insulating cover 21 which covers the dome 13. The optics 8 are accommodated in the front section 19. The front longitudinal section 19 can, as shown, project through the aperture 20 or complete the same in a flush manner.

This exemplary embodiment is advantageous in that radiation of light patterns L into the cooking chamber 3 is possible unhindered and the combined antenna 6, 15 is thus protected particularly effectively against dirt from the cooking chamber 3.

The front longitudinal section 19 can be fixedly connected to the rear longitudinal section 18 and thus rotate together with the rear longitudinal section 18. The connection between the rear longitudinal section 18 and the front longitudinal section 19 renders the light path particularly stable with respect to thermal deformations.

It is however also possible for the front longitudinal section 19 to be fixedly connected to that of the cover 21, and for an air gap or another sliding surface to be present between the front longitudinal section 19 and the rear longitudinal section 18. The optics 8 can then be present in the rear longitudinal section 18, for instance, and/or the line pattern L can inter alia already be generated by a rotating laser 7 in accordance with at least its basic shape.

Figure 7:
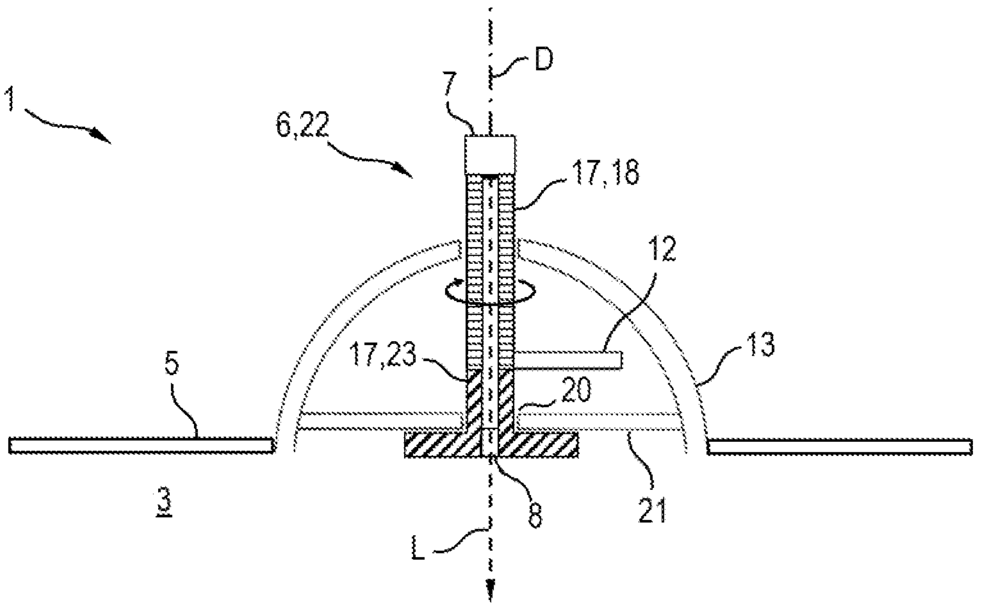
FIG. 7 shows as a sectional representation in the side view a drawing of another variant of the microwave cooking appliance from FIG. 1 with a pattern luminaire integrated into a microwave antenna according to a third exemplary embodiment.

FIG. 7 shows as a sectional representation in the side view a drawing of another variant of the microwave cooking appliance 1 with a pattern luminaire 6 integrated into a microwave antenna 22. The microwave antenna 22 is embodied similarly to the microwave antenna 15, wherein the front longitudinal section 23 is however now formed so that it completely covers the aperture 20. As a result, the dome 13 is separated more effectively from the cooking chamber 3. In order to prevent friction between the front longitudinal section 23 and the cover 20, an air gap can remain between the two parts 20, 23.

Figure 8:
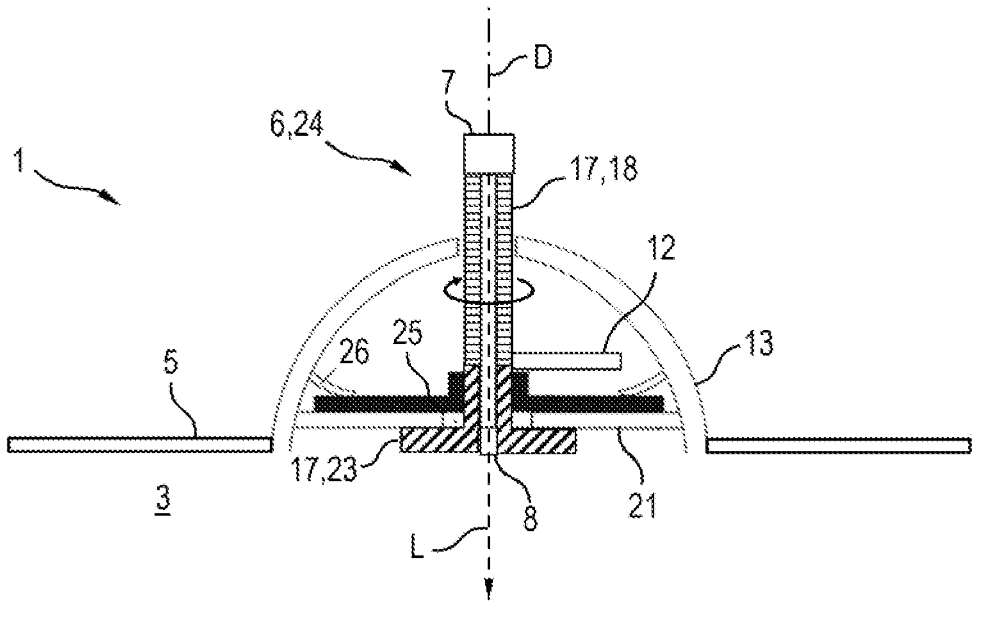
FIG. 8 shows as a sectional representation in the side view a drawing of another variant of the microwave cooking appliance from FIG. 1 with a pattern luminaire integrated into a microwave antenna according to a fourth exemplary embodiment.

FIG. 8 shows as a sectional representation in the side view a drawing of another variant of the microwave cooking appliance 1 with a pattern luminaire 6 integrated into a microwave antenna 24. The microwave antenna 24 is embodied similarly to the microwave antenna 22, wherein on the side facing away from the cooking chamber 3 the aperture 20 is now closed or covered by a cover seal 25. The cover seal 25 can be a disk, which rests on the cover 21, or a molded part, which additionally encloses the front longitudinal section 23. The larger the sealing surface, in other words the contact surface between the cover 21 and the front longitudinal section 23 and the cover seal 25, the better therefore the antenna dome 13 is sealed. The two-sided closure of the through opening 20 of the cover 21 is advantageous in that the gap between the front longitudinal section 23 and the cover 21 can be liberally dimensioned and the dome 13 is nevertheless closed, in particular in an air-tight manner. This results in easier manufacturability of the components, since no precise measuring tolerance is to be required (e.g. an eccentric running/oscillating of the axis of rotation D is allowed). With manufacturing-specific deviations in the geometry, it can also be ensured that no dirt from the cooking chamber 3 can penetrate into the dome 13 and further e.g. into a hollow cavity of a microwave guide and/or into switch compartment.

The cover seal 25 can additionally be pressed onto the cover 21 by a holding apparatus such as a spring 26, in order to hold it in position. This means that the cover seal 25 always rests in a planar manner on the cover 21.

Figure 9:
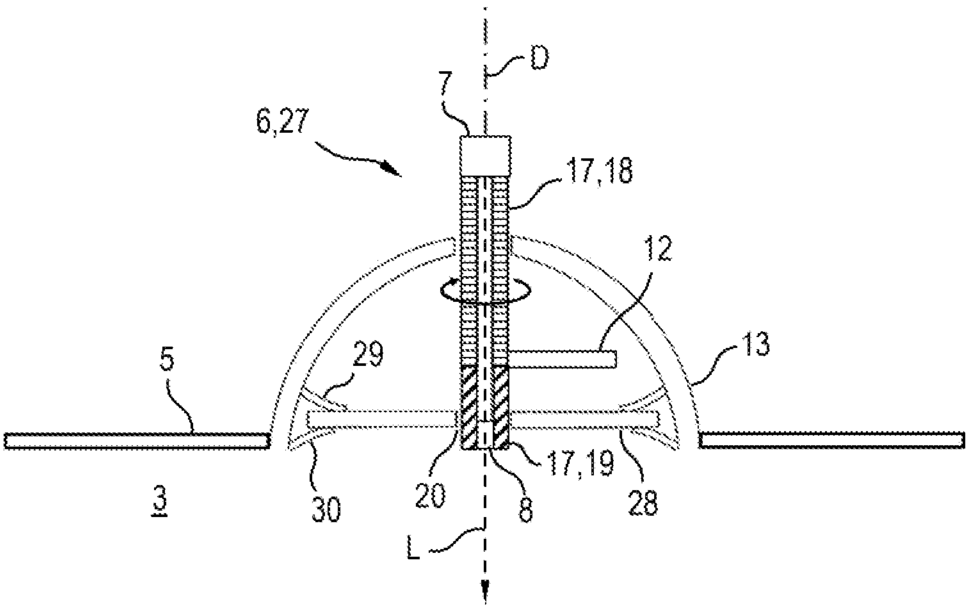
FIG. 9 shows as a sectional representation in the side view a drawing of another variant of the microwave cooking appliance from FIG. 1 with a pattern luminaire integrated into a microwave antenna according to a fifth exemplary embodiment.

FIG. 9 shows, as a sectional representation in the side view, a drawing of another variant of the microwave cooking appliance 1 with a pattern luminaire 6 integrated into a microwave apparatus 27. Contrary to FIG. 6, the cover 28 is now not fixedly connected to the ceiling 5, but instead movably fastened thereon by means of fastening lugs 29, 30. With an eccentric course of the combined antenna 6, 27 the cover 28 can follow its movement on account of the lateral distance between the cover 28 and the ceiling 5. This likewise results in easier manufacturability.

The different exemplary embodiments enable an undisturbed introduction of the microwave power and the light beam while simultaneously protecting against dirt.

In general, and also implementable in the exemplary embodiments, the optics 8 can be protected against contamination from the food to be cooked, e.g. by means of splashes of grease. This can be achieved for instance by providing a shutter or closure, which can be controlled so that the optics 8 are only exposed during an injection of light into the cooking chamber 3. A further possibility is to allow the optics 8 for light radiation to look out from the shaft 14, 17 and to withdraw the same after light radiation into the shaft 14.

The present invention is naturally not restricted to the exemplary embodiment shown.

In general "one", "a" etc. can be understood to mean a single or a multiple, particularly in the context of "at least one" or "one or more" etc. provided this is not explicitly excluded, e.g. by the expression "precisely one" etc.

A figure can also comprise precisely the specific figure and also a typical tolerance range, provided this is not explicitly ruled out.

The invention claimed is:

1. A household appliance, comprising:

a treatment chamber for treating material;

a pattern luminaire designed to radiate a light pattern into the treatment chamber;

an image sensor directed into the treatment chamber for capturing the light pattern reflected from the treatment chamber;

a motor operably connected to the pattern luminaire for rotating the pattern luminaire into different angles of rotation so as to enable the household appliance to determine at least one item of contour information from material irradiated by the light pattern from at least two reflected light patterns associated with different ones of the angles of rotation of the pattern luminaire, wherein the pattern luminaire includes a light source for generating a light bundle and an optical element, which is arranged optically downstream of the light source, for generating the light pattern from the light bundle emitted by the light source, and a rotatable microwave antenna which includes a hollow shaft mounted for rotation about a longitudinal axis thereof for feeding microwaves into the treatment chamber, said optical element of the pattern luminaire being accommodated in the shaft of the microwave antenna.

2. The household appliance of claim 1, wherein the pattern luminaire is a circumferentially rotatable pattern luminaire.

3. The household appliance of claim 1, wherein the household appliance is designed to determine the at least one item of contour information of the material from a superimposition of the at least two reflected light patterns associated with the different angles of rotation of the pattern luminaire.

4. The household appliance of claim 1, wherein the light patterns are individual lines.

5. The household appliance of claim 1, wherein the pattern luminaire includes a beam-forming optics and is rotatable about an optical axis of the optics.

6. The household appliance of claim 1, further comprising at least one further said image sensor, said at least two image sensors arranged at a distance from one another and directed into the treatment chamber at different spatial angles.

7. The household appliance of claim 1, further comprising a cover configured to separate the shaft from the treatment chamber and having an aperture, said shaft having a first, electrically conducting longitudinal section and a second longitudinal section, said second longitudinal section being guided through the aperture and configured to accommodate the optical element therein.

8. The household appliance of claim 7, wherein the second longitudinal section is electrically non-conducting.

9. The household appliance of claim 1, wherein the at least one item of contour information determines a height, a surface shape, a surface area, a volume and/or a mass of the material.

* * * * *